"""
3,267,122
BIS-(GAMMA-ISOCYANATO)-ALKOXY ALKANES
AND PREPARATION THEREOF
Wolfgang Lehmann, Leverkusen, and Heinz Ziemann, Leichlingen, Rhineland, Germany, assignors to Farbenfabriken Bayer Aktiengesellschaft, Leverkusen, Germany, a German corporation
No Drawing. Filed Feb. 1, 1963, Ser. No. 255,693
Claims priority, application Germany, Feb. 7, 1962,
F 35,958
4 Claims. (Cl. 260—453)

This invention relates to isocyanates and more particularly to a novel method for the production of aliphatic isocyanates.

The conversion of aliphatic amines by phosgenation to the corresponding isocyanates is known in the art. It is also known that diamines which contain ether groups upon phosgenation yield mainly ether cleavage products. For example, diamines obtained by the addition of acrylonitrile to bifunctional alcohols with subsequent hydrogenation upon phosgenation yield mostly cleavage products with an accompanying minute amount of diisocyanate formed; see in this regard Annalen der Chemie, vol. 562, page 87 (1949). In view of the extremely small amount of diisocyanate formed in these known phosgenation processes, the use of diamines containing ether groups in the production of diisocyanates has been considered to be commercially impractical.

It is, therefore, an object of this invention to provide a novel process for the production of aliphatic isocyanates via aliphatic amines containing ether groups without the undesirable low yields and other disadvantages of the prior art. A further object of this invention is to provide a novel process for the production of isocyanates adaptable to presently existing systems and equipment. Still a further object of this invention is to provide a novel process for producing isocyanates by the use of specific amines containing ether groups. Another still further object of this invention is to provide an improved process for making isocyanates in good yields by the use of certain ether groups containing amines.

The foregoing objects and others are accomplished, generally speaking, by providing a process for the production of isocyanates which comprises reacting phosgene with an amine having the following general formula:

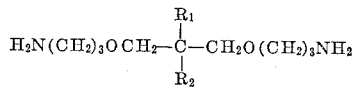

wherein $R_1$ and $R_2$ are selected from the group consisting of alkyl, aryl, cycloalkyl, haloalkyl, $\gamma$-aminopropoxyalkyl and mixtures thereof. The term "cycloalkyl" includes among others, two cycloalkyl radicals which will form a closed cycloaliphatic ring. Only when using certain amines (as above defined in the formula) will the corresponding isocyanate be formed in desirable yields. As above pointed out, the prior art generally teaches the formation of minute amounts of isocyanate upon phosgenation of diamines comprising ether groups, but not substituted by $R_1$ and $R_2$ as above indicated. When the diamines of the above formula are used, the results are contrary to the teachings of the prior art. The phosgene and amine may be reacted by conventionally known methods (for example, that disclosed in German Patent 876,238 and U.S. Patent 2,901,497) to give the desired isocyanate in a good yield. Not only is a desirable yield of isocyanates obtained, but by the present process, little if any, ether cleavage occurs. It should be understood that rather than the use of the free amines, their salts such as hydrochlorides or carbamates may be used in the process as herein defined.

The amines which are used as a reaction component in the present process may be prepared via any known methods. They can, for example, be prepared by the reaction of the acrylonitrile with bifunctional alcohols and subsequent hydrogenation of the resulting reaction mixture. Typical of those alcohols that may be used are 2,2-dimethylolpropane, 3,3-dimethylol-n-pentane, 1,1,1-trimethylolpropane, pentaerythritol, 1,3-dichloro-2,2-dimethylolpropane, 2-methyl-2-propyl-propane-1,3-diol, 1,1-dihydroxymethyl-cyclohexane, 2,2-dicyclohexylpropane-1,3-diol, 2-phenyl-2-ethylpropane-1,3-diol and 2,2-diphenylpropane-1,3-diol and mixtures thereof. The isocyanates prepared by this invention may be reacted with polyhydroxy compounds to make polyurethane materials for use in lacquers, adhesives, foams, elastomers and the like.

The phosgenation of the amines may be effected by known methods such as, for example, by cold phase-hot phase phosgenation, or by the hydrochloride process wherein the corresponding amine-hydrochloride is phosgenated. Also the phosgenation can be carried out intermittently or in a continuous manner. It is preferred for best results that an inert solvent be used in the process of this invention; typical solvents are toluene, xylene, chlorobenzene, o-dichlorobenzene or nitrobenzene. Again for best results and highest yield, it is preferred that not too high a temperature for the phosgenation be used. For this reason, cold phase-hot phase phosgenation is usually preferred over the above-mentioned hydrochloride process. In cold phase-hot phase phosgenation, the mixture or carbamic acid chloride and amine hydrochloride forms in such a fine suspension that the hot phase phosgenation may readily be completed in a short time at temperatures between 80 and 120° C.

The isocyanates prepared according to the invention are obtained in such a pure form that a separate purification such as by recrystallization or distillation is not required. A brief heating of the reaction product in vacuo below the boiling point of the solvent used or by blowing a neutral gas through it at high temperatures is sufficient for destroying or otherwise disposing of any carbamic acid chlorides still present. These purification procedures also are quite effective in removing excess phosgene from the reaction mix.

The polyisocyanates obtained are valuable intermediate products for the production of polyurethane elastomers and foams by the isocyanate polyaddition process. They can be used as such, and also for example, as urethane polyisocyanates by addition of polyalcohols to these isocyanates, one OH equivalent preferably being used for two NCO equivalents, and also as diisocyanates comprising urea groups by reaction of water with the isocyanate at lower or only slightly elevated temperatures. In addition, trimerization products of the isocyanates may be used as well as polyisocyanates comprising biuret groups, such as those obtainable according to French Patent 1,228,477 or as masked polyisocyanates which liberate their NCO groups in known manner under heat. The products of the process are also suitable starting materials for the production of di-, tri- and tetra-ethyleneimine ureas.

The following examples will further define the specifics of this invention. Parts are by weight unless otherwise indicated.

*Example 1*

About 100 parts by weight of 1,3-bis-($\gamma$ aminopropoxy)-2,2-dimethylpropane are dissolved in about 1000 parts by weight of toluene. Dry carbon dioxide is introduced with stirring into this cooled solution. The reaction mixture is then heated in a stream of $CO_2$ to about 40 to 50° C., the initially jelly-like mass becoming thinly liquid and capable of being easily stirred. After completion of saturation with carbon dioxide, the mixture is cooled again to about 0° C. and a strong stream of phosgene is conducted through the reaction vessel. During the phosgenation (with a slow rise in temperature) a crystalline suspension is formed and after about ten hours (about seven hours at about 90 to 106° C.) a clear solution is obtained. After a brief blowing through with dry nitrogen, the solvent is distilled off in vacuo. A yellow oil remains as residue which is distilled under high vacuum. After separating out a small quantity of first runnings (about 4 parts by weight), there are obtained at boiling point about 109 to 115° at 0.11 to 0.16 mm., about 93 parts by weight (about 75% of the theoretical) of 1,3-bis-(γ isocyanatopropoxy)-2,2-dimethylpropane.

$C_{13}H_{22}N_2O_4$ (270.34)—Calculated: C, 57.75%; H, 8.20%; N, 10.37%. Found: C, 57.93%; H, 8.27%; N, 10.33%; Cl, 0.70%. NCO-content: 30.75%.

After fractional distillation on a Raschig ring column about ¾ meter in height, the diisocyanate prepared in this example only contains about 0.1% of chlorine (boiling point about 0.07 mm., about 111 to 113°).

*Example 2*

About 100 parts by weight of 1,3-bis-(γ aminopropoxy)-2,2-dimethylpropane are dissolved in about 1000 parts by weight of xylene. Dry hydrogen chloride is introduced with stirring and cooling into this solution to saturation point. The dihydrochloride of the diamine formed in an exothermic reaction precipitates in the form of a thick, colorless crystal magma. After phosgene has been conducted through the reaction mixture for about six hours at temperatures up to about the boiling temperature of the xylene, almost complete solution occurs. Blowing through with dry nitrogen is then carried out for two hours with cooling. The solvent is distilled off using a water pump for the vacuum. The residue, a dark yellow oil, is distilled under high vacuum. After separating out a small quantity of first runnings, there are obtained, at boiling point about 118 to 122° and 0.45 mm., about 80 parts by weight (about 65% of the theoretical) of 1,3-bis-(γ isocyanatopropoxy) - 2,2 - dimethylpropane. (NCO content=30.9%.)

*Example 3*

246 parts by weight of 1,3-(γ-aminopropoxy)-2,2-diethylpropane are dissolved in 4000 parts by weight of 1,2-dichlorobenzene. Dry carbondioxide is introduced with stirring at 50 to 60° C. The resulting suspension is cooled to about 0° C. and a strong stream of 300 to 400 parts by weight of phosgene is conducted while stirring into a reaction vessel. The reaction mixture is brought within 3 to 4 hours while passing through phosgene to 140° C. and a clear solution is treated further 2 to 3 hours with phosgene at 150 to 170° C. After blowing through with dry nitrogen with slowly cooling down the mixture the solvent is distilled off in vacuo. The residue is distilled under high vacuum. There are obtained at a boiling point of 152 to 158° C. at 1 mm. Hg 242 parts by weight (about 81% of the theoretical) of 1,3-bis-(γ-isocyanatopropoxy)-2,2-diethylpropane.

$C_{15}H_{26}N_2O_4$ (298.39)—Calculated: C, 60.38%; H, 8.78%; N, 9.39%. Found: C, 60.35%; H, 8.73%; N, 9.44%; Cl, 0.4%.

*Example 4*

A solution of 246 parts by weight (1 mol) of 1,3-bis-(γ-aminopropoxy)-2-methyl-2 - propylpropane are dissolved in 4000 parts by weight of 1,2-dichlorobenzene and saturated at 50 to 60° C. with dry carbondioxide. Into the suspension cooled down to 0° C. 400 parts by weight of phosgene are introduced. In the course of 4 hours the reaction temperature is increased to 145° C. while further adding phosgene. The mixture is held at this temperature for 1 to 2 hours. The clear solution is blown through with dry nitrogen and concentrated in vacuo. The residue is distilled under high vacuum yielding 210 parts by weight (about 70% of the theoretical) of 1,3-bis-(γ-iso-cyanatopropoxy)-2-methyl-2-propylpropane at a boiling point of 160 to 165° C./1.5 mm. Hg.

$C_{15}H_{26}N_2O_4$ (298.39)—Calculated: C, 60.38%; H, 8.78%; N, 9.39%. Found: C, 60.24%; H, 8.85%; N, 9.42%.

*Example 5*

A solution of 258 parts by weight (1 mol) of 1,1-bis-(γ-aminopropoxymethyl)-cyclohexane in 4000 parts by weight of 1,2-dichlorobenzene are saturated with dry carbondioxide at 40 to 60° C. while stirring and then cooled to 5° C. At this temperature 200 to 300 parts by weight of phosgene are introduced. The reaction mixture is then heated in a stream of phosgene to 120 to 130° C. within 3 to 4 hours. The clear solution is finally treated for 2 hours with phosgene at 130 to 145° C. After blowing through with nitrogen the solvent is distilled off in vacuo. The yellow oily residue is distilled under high vacuo. There are obtained 232 parts by weight (75% of the theoretical) of 1,1-bis-(γ-isocyanatopropoxymethyl)-cyclohexane at a boiling point of 175 to 185° C./1 mm. Hg.

$C_{16}H_{26}N_2O_4$ (310.40)—Calculated: C, 61.94%; H, 8.43%; N, 9.02%; NCO, 27.07%. Found: C, 62.41%; H, 8.60%; N, 9.14%; NCO, 26.90%.

Although the invention has been described in considerable detail for the purpose of illustration, it is to be understood that variations can be made by those skilled in the art without departing from the spirit and scope of the invention.

What is claimed is:

1. Compounds of the formula

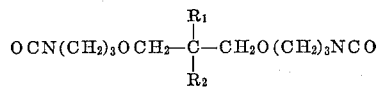

wherein $R_1$ and $R_2$ are selected from the group consisting of lower alkyl, lower haloalkyl, phenyl, cyclohexyl and γ-aminopropoxy lower alkyl.

2. Compound of the formula

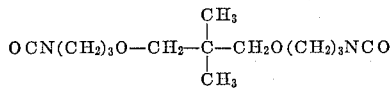

3. A process for the production of isocyanates which comprises reacting phosgene with an amine composition having the following formula

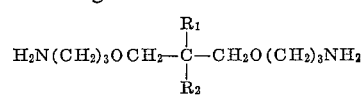

wherein $R_1$ and $R_2$ are selected from the group consisting of lower alkyl, lower haloalkyl, phenyl, cyclohexyl and γ-aminopropoxy lower alkyl, at a temperature up to about 200° C.

4. The process of claim 3 wherein said reaction is conducted in a solvent selected from the group consisting of toluene, xylene, chlorobenzene, o-dichlorobenzene, and nitrobenzene.

References Cited by the Examiner

UNITED STATES PATENTS 2,409,712 10/1946 Schweitzer _____ 260—453
3,076,788 2/1963 Hoover _____ 260—453 XR

OTHER REFERENCES

Siefken, Justus Liebigs Annalen der Chemie, 1949, vol. 562, pp. 77–136.

CHARLES B. PARKER, *Primary Examiner.*

DALE R. MAHANAND, *Assistant Examiner.*